(No Model.)

G. LISPENARD.
COTTON HARVESTER.

No. 517,050.

Patented Mar. 27, 1894.

Attest,
C. W. Benjamin
H. F. Dunbar

Inventor,
George Lispenard
by Joseph L. Levy
atty (No Model.) 9 Sheets—Sheet 2.
G. LISPENARD.
COTTON HARVESTER.

No. 517,050. Patented Mar. 27, 1894.

Attest:
C. W. Benjamin
H. F. Dunbar

Inventor:
George Lispenard
by Joseph L. Levy
atty (No Model.) 9 Sheets—Sheet 3.

G. LISPENARD.
COTTON HARVESTER.

No. 517,050. Patented Mar. 27, 1894.

Attest:
C. W. Benjamin
H. F. Dunbar

Inventor:
George Lispenard.

by Joseph L. Levy
atty (No Model.)  
9 Sheets—Sheet 4.

G. LISPENARD.
COTTON HARVESTER.

No. 517,050. Patented Mar. 27, 1894.

Attest,  
C. W. Benjamin.  
H. F. Dunbar.

Inventor:  
George Lispenard.  
by Joseph L. Levy  
atty.

(No Model.) 9 Sheets—Sheet 6.

G. LISPENARD.
COTTON HARVESTER.

No. 517,050. Patented Mar. 27, 1894.

Attest:
C. W. Benjamin
H. F. Durber

Inventor:
George Lispenard
by Joseph L. Levy
atty (No Model.) 9 Sheets—Sheet 7.

G. LISPENARD.
COTTON HARVESTER.

No. 517,050. Patented Mar. 27, 1894.

Attest:
C. W. Benjamin.
H. F. Durbur.

Inventor:
George Lispenard.
by Joseph L. Levy
atty.

(No Model.) 9 Sheets—Sheet 8.
G. LISPENARD.
COTTON HARVESTER.

No. 517,050. Patented Mar. 27, 1894.

Attest;
C. W. Benjamin.
H. F. Durbin.

Inventor,
George Lispenard.
by Joseph L. Levy
atty.

(No Model.) 9 Sheets—Sheet 9.

G. LISPENARD.
COTTON HARVESTER.

No. 517,050. Patented Mar. 27, 1894.

Attest:
C. W. Benjamin
H. F. Durber

Inventor:
George Lispenard.
by Joseph L. Levy
atty

UNITED STATES PATENT OFFICE.

GEORGE LISPENARD, OF BROOKLYN, ASSIGNOR TO SOLOMON K. LICHTENSTEIN, TRUSTEE, OF NEW YORK, N. Y.

COTTON-HARVESTER.

SPECIFICATION forming part of Letters Patent No. 517,050, dated March 27, 1894.

Application filed January 21, 1893. Serial No. 459,078. (No model.)

*To all whom it may concern:*

Be it known that I, GEORGE LISPENARD, a citizen of the United States, residing at Brooklyn, in the county of Kings and State of New York, have made certain new and useful Improvements in Cotton-Harvesters, of which the following is a specification.

My invention relates to that class of cotton pickers in which a series of cotton picker stems are located in a frame one above the other, the frame being supported on wheels from which the power to drive the picker stems is derived, the frame being adapted to straddle a row of cotton plants which pass between the picker stems.

My invention relates to the various improvements in such a machine, all of which will be hereinafter set forth and further pointed out in the claims.

In the drawings forming part of this specification

Similar letters and figures of reference refer to similar parts throughout the several views.

I shall first describe the main frame of the machine, its sustaining and drawing devices. The main element of this frame is the arched channel beam 1, open at the bottom, the top member 2 of which extends across the frame, the side members 3 being provided with slots 4 near the bottom thereof. (See Figs. 4 and 7.) The side pieces 5 of the beam have corner braces 6 (Fig. 4) extending diagonally on each side. An inverted channel beam 7 is secured about centrally to the top section 2 of the arch beam 1 by bolts 8, Fig. 5, and near the ends of the beam 7 are secured angle irons 9, 10 through the ends of which pass side tie rods 11, the ends of which project out from the angle irons 9, from which ends extend the diagonal braces 12 (on each side) the lower ends of which are secured to the side flanges 5 of the side members 3 of the arch beam 1, the upper ends being confined on the tie rods by nuts 13. This comprises the main frame, and the propelling and power wheels are secured thereto, and made adjustable up or down as follows: The side members 3 of the arch beam 1 have a series of holes 14 (Figs. 7, and 8) lying above the slot 4, and against the inner face of the side member 4 lies a detachable plate 15 carrying a bolt 16, which can be passed through any of the holes to adjust the plate up or down. To the plate 15 is secured the hub spindle 17 by a nut 18, or otherwise. The spindle passes through the slot 4 and extends out from the side member 3 against which rests a washer 19 which encircles the spindle. The propelling wheels 20 are secured to the spindle to rotate thereon, and between the washer 19 and wheel 20 lies the power sprocket wheel 21, which is secured to the propelling wheel by the staples 22 encircling the spokes 23, so that rotary motion is given to the power wheel through the propelling wheel. It will thus be seen that by inserting the bolt 16 in any one of the holes 14, the frame can be raised or lowered on the wheels. As both sides of the frame are alike, I have only described one side.

It may be necessary to give the frame a tilt at either end, for the purpose of changing the plane of the picker stems, so as to incline them to the perpendicular, which will increase the operative surface of the picker stems. This I accomplish by making the union of the main frame and the draft bar an adjustable one. The draft beam 24 (which carries the usual yoke 25 and draft equalizer 26) is bifurcated at the end where it meets the channel beam 7 and has an enlargement 27 through which a draft pin 28 passes. A casting 29 having lips 30 is secured within the beam 7, as shown, which casting has an upwardly extending stem 31 ending in a plate 32, extending forwardly about which the bifurcated end of the draft bar 24 lies and through which the pin 28 passes. The plate 32 is provided with a series of holes 33 disposed concentrically about the pin 28, and the draft bar has a like aperture 34 aligning with the plane of the holes 33 through which a pin 35 passes, and likewise through any of the holes 33. By removing the pin and tilting the frame at either end on the supporting wheels, and placing the pins in any one of the holes in accordance with the change, the frame and stems can be given the desired inclination to the line of cotton bushes, and thereby present a greater surface of picking instrumentalities to the bush.

Figures 7, 8, 28, 29, 30, 31:
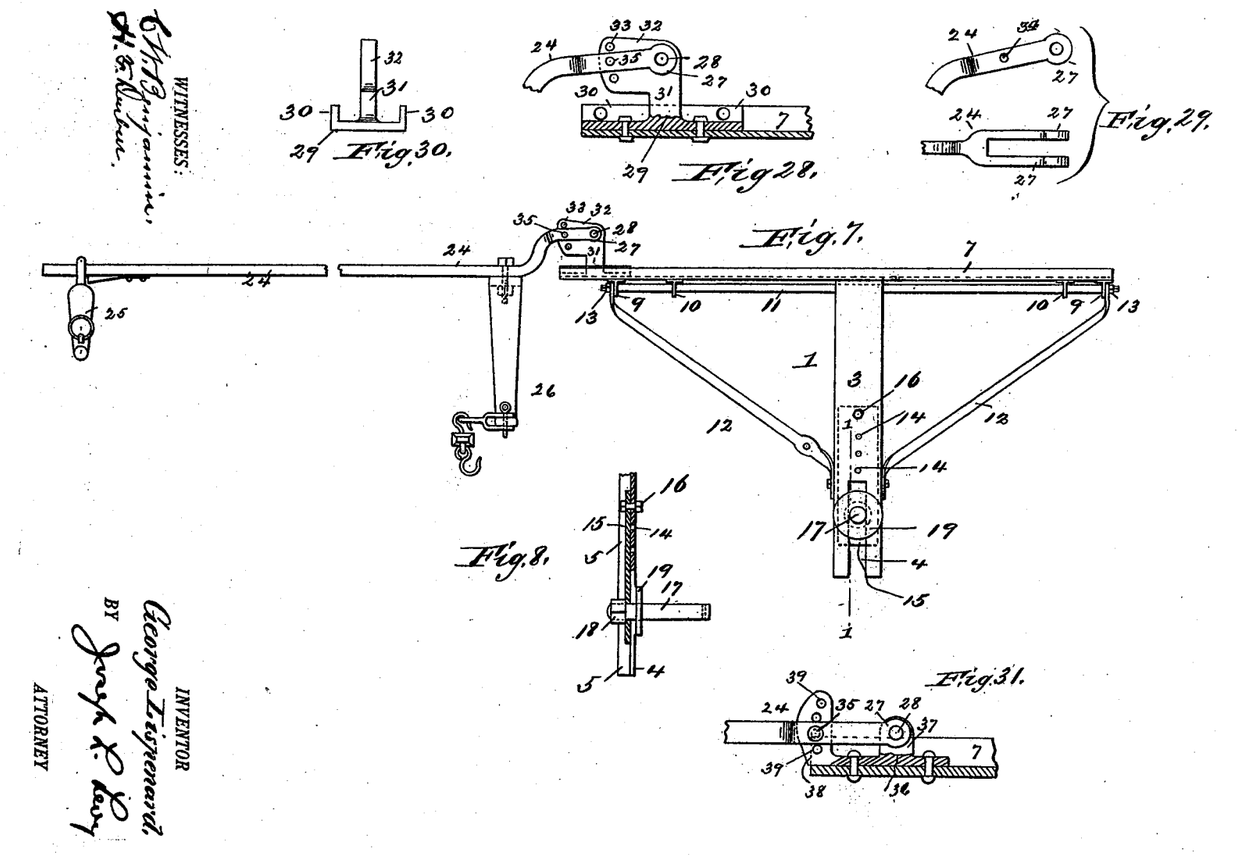
Fig. 7, a side elevation of the main frame of the harvester, showing the method of securing the draft bar thereto.
Fig. 8, a sectional elevation on the line $ll$, Fig. 7, of the means of raising or lowering the main frame on the supporting wheels.
Fig. 28, an enlarged side elevation and section of the connection between the draft bar and the main frame.
Fig. 29, a side elevation and plan of the end of the draft bar.
Fig. 30, a front end elevation of the adjusting plate, or union of the draft bar and main frame.
Fig. 31, a side elevation of a modified form of connection.

A modified form of connection is shown in Fig. 31, in which a casting 36 having an apertured lug 37 at the end is bolted to the beam 7, the front end of the casting having a plate 38 and holes 39, the other parts being arranged in substantially the same way as the structure shown in Fig. 7.

Figure 9:
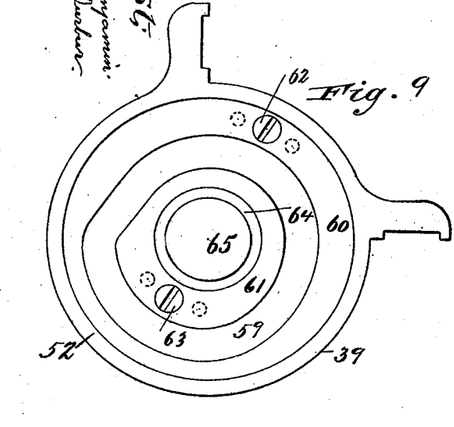
Fig. 9, an enlarged side elevation of the picker stem head, and controlling cam way.
Figure 10:
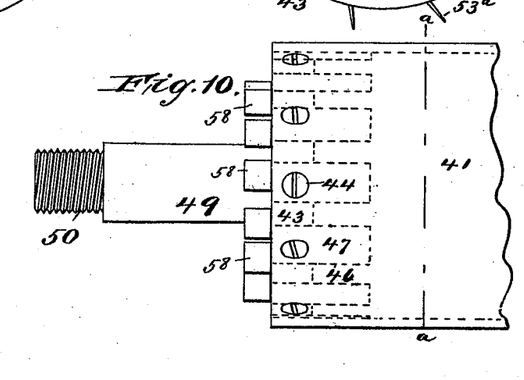
Fig. 10, a side elevation of one end of the picker stem detached from the head.
Figure 11:
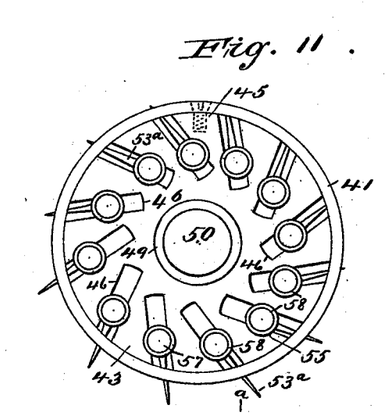
Fig. 11, an end elevation of the same.
Figure 12:
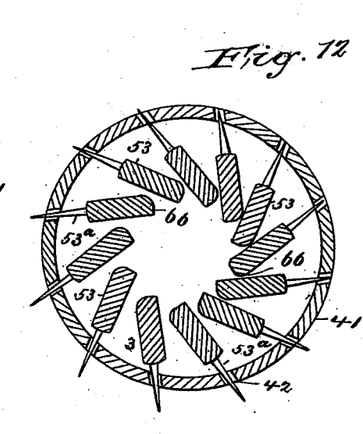
Fig. 12, a sectional elevation through the picker stem on the line $aa$, showing a detached portion of the head.
Figures 13, 14, 15:
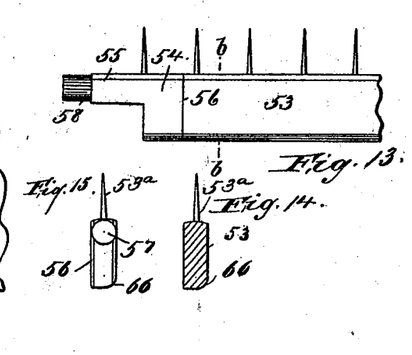
Fig. 13, a side elevation of one end of one of the hackle bars.
Fig. 14, a sectional elevation on the line $bb$, Fig. 13.
Fig. 15, an end elevation.
Figure 21:
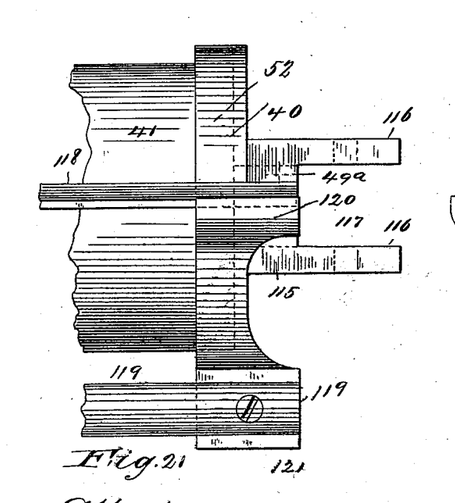
Fig. 21, a side elevation of the rear head of the picker stem, with a portion of the picker cylinder and guard bars secured thereto.
Figure 22:
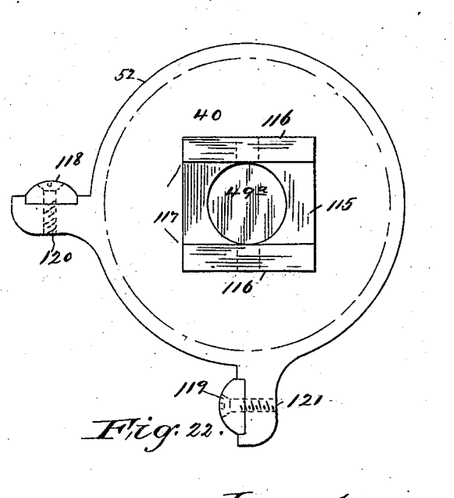
Fig. 22, an end elevation thereof.

I shall now describe the picker stems and the manner of supporting them within the main frame. Each stem has two heads 39, 40, the head 39 being located in the front and 40 at the rear of the machine. Between the heads extends an apertured cylinder 41, the apertures 42 being placed at regular intervals longitudinally and concentrically and which extend therethrough obliquely. The cylinder has at each end slotted blocks 43 which fit the interior of the cylinder snugly and are secured in place by screws 44 which enter the blocks through the unslotted portions 45 (Fig. 11). Each block is provided with oblique slots 46 which cut the periphery of the block, the block being cup shaped and having the inwardly extending ledge 47, the outer edge 48 of which forms a bearing for the hackle bars as hereinafter set forth and steadying the cylinder. The block 43 which lies within the end of the cylinder 41 which enters the head 39, has extending therefrom a central spindle 49 ending in a screw threaded extension 50 which takes the miter pinion 51. This pinion drives the picker stem, the thread of the extension 50 lying in the direction of the motion of the stem. The opposing block has a short spindle $49^a$ which finds bearings in a hole in the head 40, Figs. 21 and 22. Both heads 39, 40 have an annular and circumferential ring or wall 52 in which the ends of the cylinder 41 lie and which form shields for the ends of the cylinder, and to keep the cam rings in place as hereinafter set forth. Hackle bars 53 which have a series of projecting hackle pins $53^a$ lie within the cylinder 41, and are supported therein by the oblique slots 46 in the blocks 43. Both ends of the hackle bars are provided with inverted L shaped extensions 54, the extreme portion 55 being of less diameter than the portion 54 so as to permit the slots 46, within which the extensions 54 lie, to be smaller relatively than the main portion of the bar 53 to preserve the strength of the blocks and bars, the extensions forming a shoulder 56 which bears against the face of the inner portion 47 of the blocks and which form bearing surfaces for the hackle bars. The portion 55 of the extension 54 has a cylindrical bearing 57 upon which lies an anti-friction roller 58. Each of the heads has lying within the ring 52 a cam way 59 formed by the rings 60, 61 which are secured to the heads by the screws 62, 63, additional holes being made in the head by means of which the rings can be moved within the head to change the direction of the cam way for altering the point of projection and withdrawal of the hackle pins, (see Fig. 9, dotted lines,) and the ring 61 has an annular ring 64 extending therefrom, and surrounding the circular aperture 65 through which the spindles 49 and $49^a$ extend and which form with the heads bearings for it, and which keep the cam block 61 in position. By reference to Fig. 12 it will be seen that the hackle bars and pins lie obliquely to the horizontal axis of the cylinder, and that some of the pins are projected without the cylinder and others within, and in order to enable the bars to clear each other one of their lower corners is rounded as shown at 66. The rollers 58 lie in the cam way 59, and the hackle bars are thus directed in their movements by the contour of this cam way. If it is desired to change the points of projection and withdrawal of the pins, the change can be made as before set forth.

Figure 19:
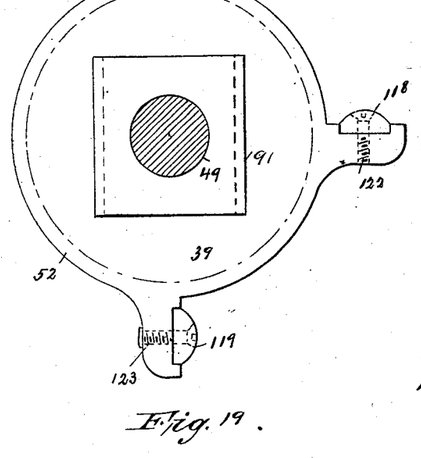
Fig. 19, a front elevation of the front picker stem head, partly in section on the line $ee$, Fig. 20.
Figure 20:
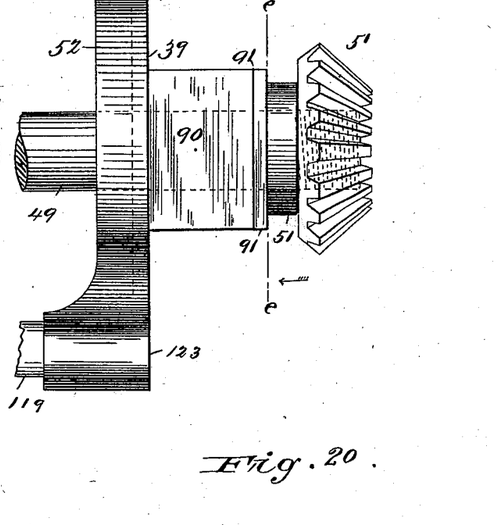
Fig. 20, a plan view of the same.
Figures 23, 24:
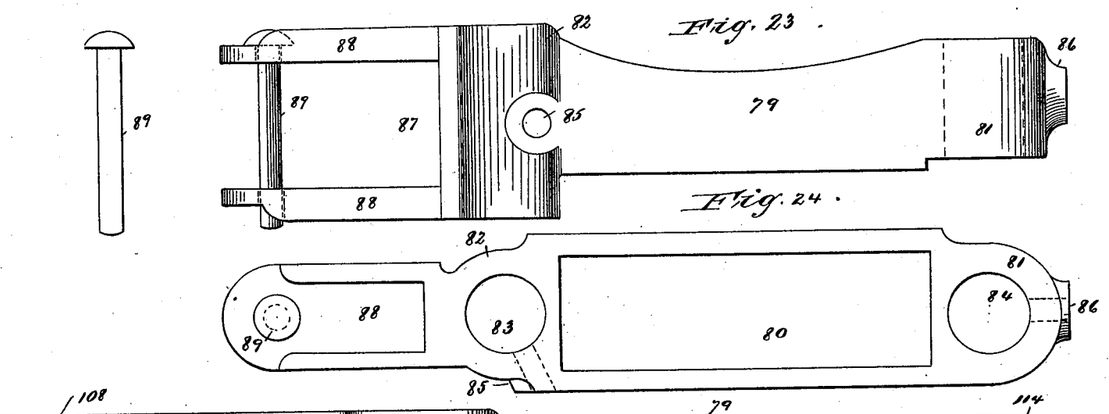
Fig. 23, a side elevation, enlarged, of the front picker stem hanger.
Fig. 24, a top plan of the same.

The picker stems are supported in the frame as follows: The forward support for the stems comprises the block 67 (both series of stems being supported in the same manner) having the upwardly extending journal blocks 68, which form bearings for the counter shaft 69, having fast thereto the miter wheel 70 and sprocket wheel 71. The block 67 lies between the front cross bars 9, 10, and is supported thereby, and the blocks being unconnected either one or both can be moved to or from the center of the machine along said bars. Four rods descend from each of the blocks, see Figs. 3 and 5. One, 72, passes through the block 67 and carries at the top a miter pinion 77 meshing with the wheel 70, and at different points of its height the miter wheels 78, which gear with miter wheels 51, Fig. 20, on the end of the spindle 49. Two other rods or posts 73, 74 are bolted to the blocks 67 (see position of nuts, Fig. 5) which carry at predetermined points the hanger bars 79, Figs. 23 and 24. These bars are of any suitable shape, but that shown is preferred, in which the central portion is cast with an aperture 80, to decrease their weight; and at each end of the central portion they have the apertured collars 81, 82, the rod 73 passing through the aperture 83 in the collar 82, and the rod 74 passing through the aperture 84 in the collar 81, both collars having openings 85, 86 respectively through which set screws pass to bind the bars on the rods. The inner end of the bar has a squared aperture 87, which is defined by the arms 88, the outer portions of which are apertured for the passage of a pin 89. Referring to Figs. 19 and 20 it will be seen that the head 39 has an outwardly extending squared lug 90, (through which the spindle 49 passes) the end of which has on two sides a shoulder 91. In assembling the parts the pin 89 is removed from the arms 88, and the lug 90 is passed into the squared aperture, the flat of the arms lying against the top and bottom of the lug, the shoulder 91 lying against the outside of the arms, the spindle 49 and pinion 51 projecting out beyond the arm, (as in Fig. 1) and meshing with the pinion 78.

In order to prevent the front portion of the stems and their supports from becoming entangled with the bush, I provide a fender 92 which is supported from the rod 76 in front of the stems, &c., as shown. The fenders are segmental in form, and have lugs 93, Fig. 5, to which are secured the arms 94, the inner ends of the arms encircling the rod 76, to which they are secured by set screws (and to the lugs 93 likewise) so that by loosening the screws the fender can be vibrated on the rod 76 to cause it to occupy the desired position, a further adjustment being had on the lugs 93. Thus the opening leading into the space between the picker stems can be contracted or enlarged.

Figure 2:
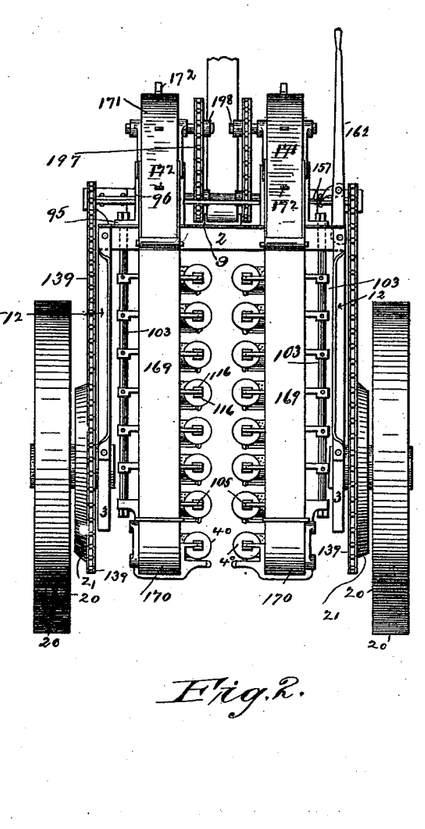
Fig. 2, a rear elevation.
Figure 3:
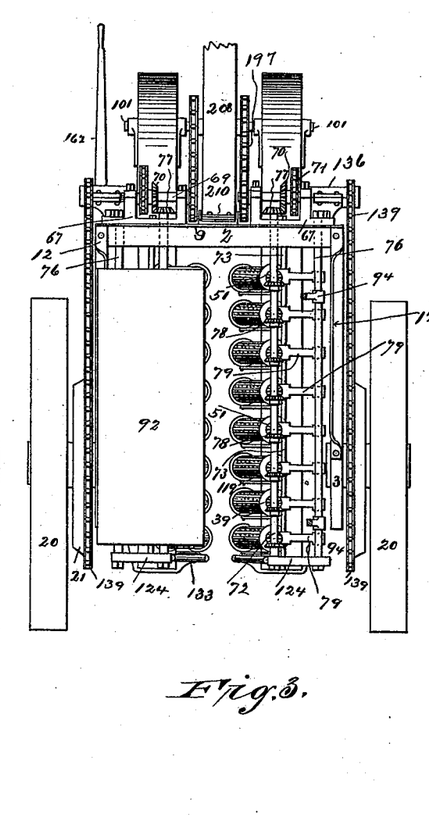
Fig. 3, a front elevation.
Figures 25, 26:
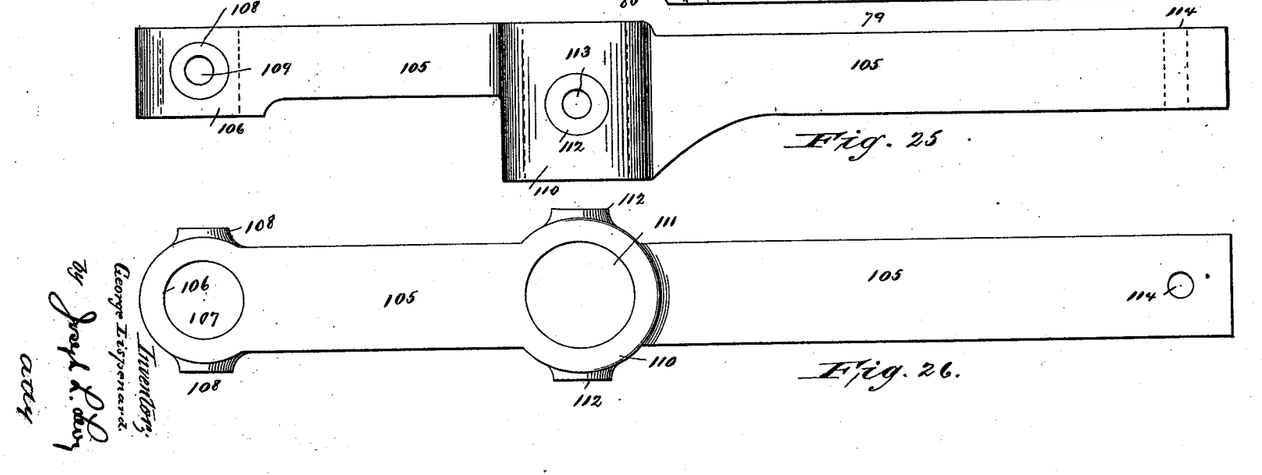
Fig. 25, a side elevation, enlarged, of the rear picker stem hanger.
Fig. 26, a top plan of the same.

The rear portions of the stems are mounted as follows: Between the two rear cross bars 9, 10 lies a block 94, having an ear 95 at one side and an arm 96 ending in the bifurcated and angular pillars 97 which are adjustably secured within the recess 98 of the bearing standard 99 through the eye 100 of which passes a short shaft or spindle 101 upon which is mounted the pulley 102. Secured to the ear 95 and depending therefrom is a rod 103, and also depending from the block 94 is a like rod 104. A hanger bar 105, Figs. 25 and 26, having the integral bushings or collars, to wit: 106 at one end with its circular aperture 107, boss 108 and aperture 109 for the passage of a set screw; collar 110 between the ends with its circular aperture 111 and bosses 112 through which the aperture 113 passes and which is adapted to take a set screw; and the circular aperture 114 at the end, through which a pin, like 89 is passed. By reference to Fig. 4 it will be seen that the hangers 105 are supported upon the rods 103, 104 and that they extend transversely of the frame. The rear head 40, Figs. 21, and 22, has an outwardly extending squared lug 115 having arms 116 flush with it, the arms forming a slot 117 into which the squared end of the hanger 105 passes (as in Fig. 2) and is secured therein by a pin like 89 which passes through apertures (dotted) on the arms 116, and through the hole 114 in the hanger 105. Thus the stems are supported within the frame; the front hanger bars being shorter than the rear the stems diverge from the rear to the front outwardly, and form two converging walls of superposed pickers, adjustable vertically on their supporting rods, and as will be subsequently set forth adjustable transversely, in addition to the adjustment in relation to the horizontal, as before set forth. The cylinder 41 of the picker stem is rotatably supported on the spindles 49, 49ª in the front and rear heads, and the heads are tied together by tie bars 118, 119, which are secured by screws to the lugs 120, 121, 122, 123 on the front and rear heads respectively, the lugs being recessed to receive the bars which are curved on the exterior (as well as are the lugs) so as not to oppose any angular surface to the bush. These bars not only tie the respective heads of the picker stems together but act as guards to prevent the entry between the superposed pickers of broken twigs, bolls or the like. Referring to Fig. 3 it will be seen that the bar 119 lies below the superposed picker and between it and the one immediately below it, thus offering a barrier for twigs, &c. The front rods 72, 73, 74, 76 are all tied together at the bottom by a tie bar or casting 124 by nuts, &c., on the ends of the rods; and the rear rods 103, 104 are tied together by a peculiar shaped casting, shown in full in Fig. 4, in which the horizontal arm 125, having the collars 126, 127 act both as a hanger bar (as 105) and as a tie bar, the rods 103, 104 passing through the collars 126, 127 respectively. From the arm 125 the casting depends in the form of a bracket 128, 129, 130, these three parts making an inverted U, from the part 130 of which extend the arms 131, 132, superposed, the arm 131 supporting the rear end of one of the pickers. A tie bar 133, Fig. 3, disposed in the same plane as the stems, is secured at the ends to the arm 130, and tie bar or casting 124 firmly uniting the rear and front supports for the picker stems into a picker frame, one on each side of the main frame. The front and rear blocks 67, 94 being adjustably secured between the cross bars 9, 10 each wall of superposed picker stems can have an amplitude of adjustment to or from the longitudinal center of the machine within the limits of the main frame, but this adjustment is not automatic nor non-manual, but is distinctively manual.

Figure 6:
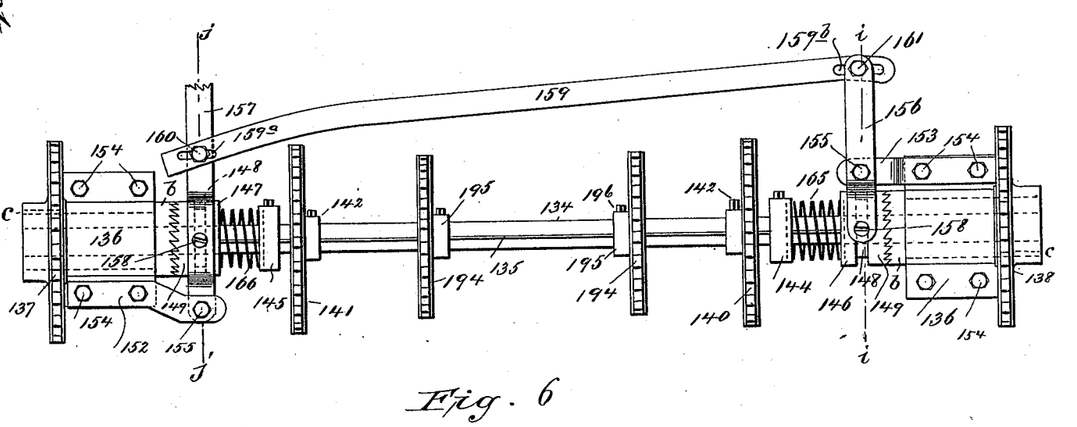
Fig. 6, an enlarged plan of the clutch mechanism and driving connections.
Figure 35:
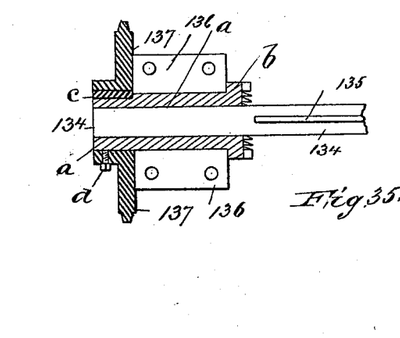
Fig. 35, a transverse section, approximately on the line $oo$, Fig. 1, of the clutch mechanism.

The pickers are driven as follows: A shaft 134, Fig. 6, with a suitable feather 135 raised thereon is journaled in the clutch sleeve $a$ which has the toothed clutching face $b$, Fig. 35, which bears in and against the face of the bearing 136 secured to the arch beam 1 as shown, and this sleeve has fast thereon at both sides of the frame the sprocket wheels 137, 138 which lie without and against the face of the bearings 136, and which are secured to the sleeve by the feather $c$ on the sleeve and set screw $d$ passing through the hub of the sprocket wheel. The shaft 134 is free to revolve in the sleeve, the feather 135 on the shaft ending where it enters the clutching face $b$. A sprocket chain 139 leads from the power sprocket wheel 21 to the sprocket pinions 137, 138, so that rotation is given to the shaft 134 through the power and supporting wheels 20. Two additional sprocket pinions 140, 141 are fast to the shaft 134, their hubs having set screws 142 for adjustment on the shaft, the pinions being connected with the sprocket pinions 71 on the shaft 69 by means of the sprocket chains 143, and thence as before set forth to the spindle 49 of the stem.

Figure 33:
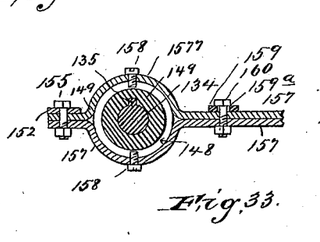
Fig. 33, an enlarged sectional elevation on the line $jj$, Fig. 6.
Figure 34:
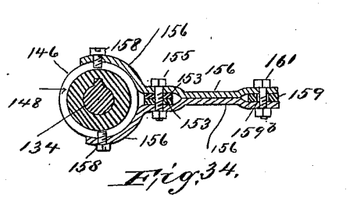
Fig. 34, a like view on the line $ii$, Fig. 6.

During certain evolutions of the machine, such for instance as turning a curve, one supporting wheel will move faster than the other, and unless means were provided for permitting a greater movement of one than the other, the shaft 134 or connecting chain would break; and to permit of this independent movement I use the following mechanism: Collars 144, 145 are secured to the shaft 134 by set screws, and between these and the bearings 136 lie the movable collars 146, 147 having the annular grooves 148, and toothed face 149, the collars working on the feather 135. Short bars 152, 153 are secured to the bearings 136 by the nuts 154, and to these bars are pivotally secured by the pins 155 the levers 156, 157. See Figs. 33 and 34. Each lever has two opposing pins 158 engaging the groove 148 in the collars 146, 147, the pin being between the fulcrum and power as to the lever 157, and the fulcrum being between the pin and power as to the lever 156, both levers being united by a cross bar 159 having the slots $159^a$, $159^b$ by the pins 160, 161 which pass through the slots. The lever 157 is continued rearwardly and upwardly and is pivotally secured to the lever 162 by the pin 163, the hub 164 of the lever 162 being pivotally supported on the side tie rod 11. Spiral springs 165, 166 lie between the collars 144, 145 and sliding collars 146, 147, and hold the toothed faces 149, &c., together. It will be noticed that the teeth of the faces 149 and on each side are set in reverse directions or at opposite angles, so that when the sprocket wheel 138 (for example) is revolving at full speed, the opposing clutch faces can slip on each other, when the motion of its motive wheel is arrested or made less than that of the other, the springs 165, 166 keeping the teeth in engagement, so that when the pressure on both clutches becomes equal they both will revolve, the slots in the bar 159 permitting the rods 156, 157 to have a slight vibratory movement. By a movement of the lever 162 toward the center of the machine, the clutch will be thrown out, checking the revolution of the stems, and also the conveyer mechanism as will be hereinafter set forth.

Figure 1:
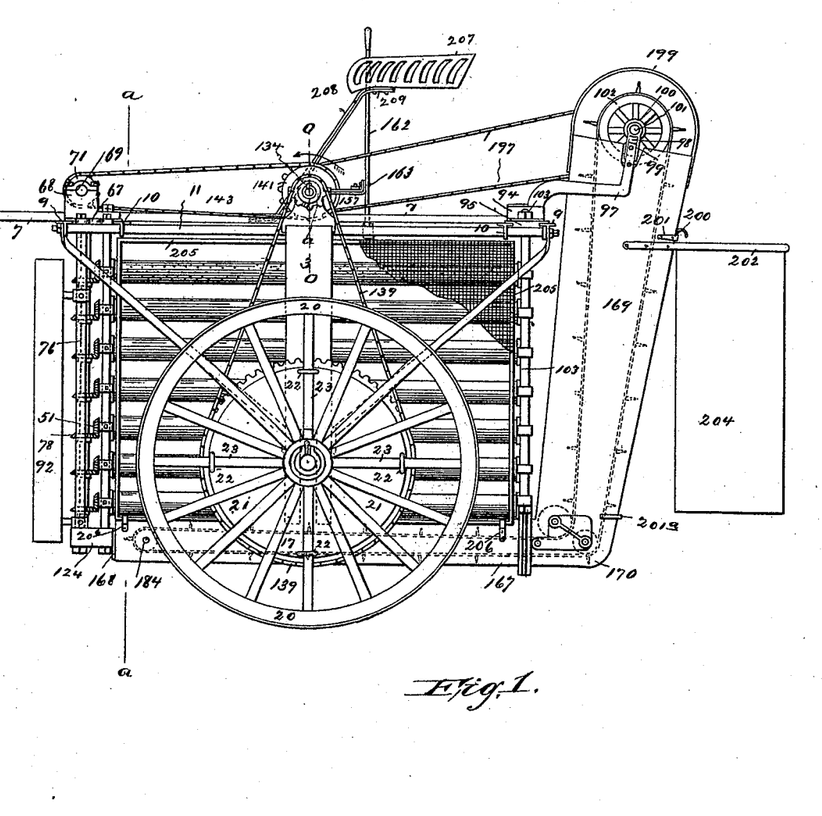
—Figure 1 is a side elevation of the machine entire, with the draft bar and means for altering the plane of the picker stems omitted.
Figure 4:
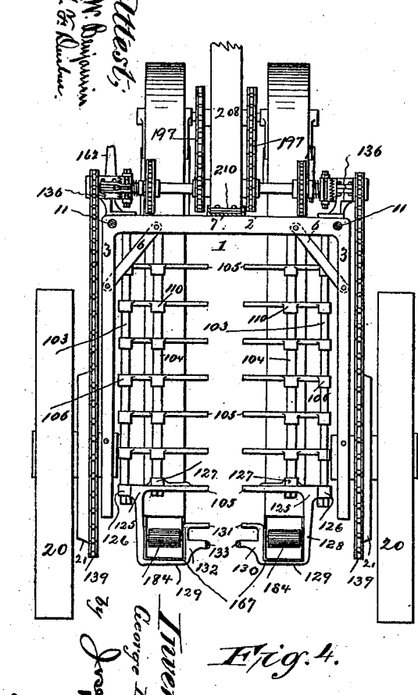
Fig. 4, a like view, partly in section on the line $aa$, Fig. 1, the picker stems and other parts being removed.
Figures 5, 32:
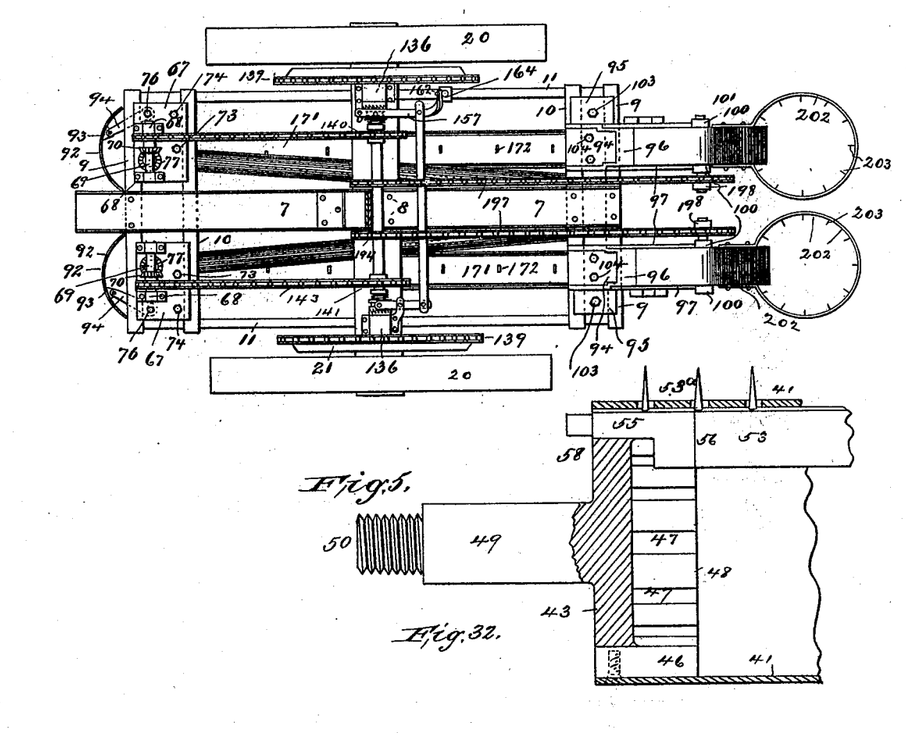
Fig. 5, a plan, the driver's seat and draft bar being detached.
Fig. 32, an enlarged sectional elevation of the front end of the picker stem.
Figure 16:
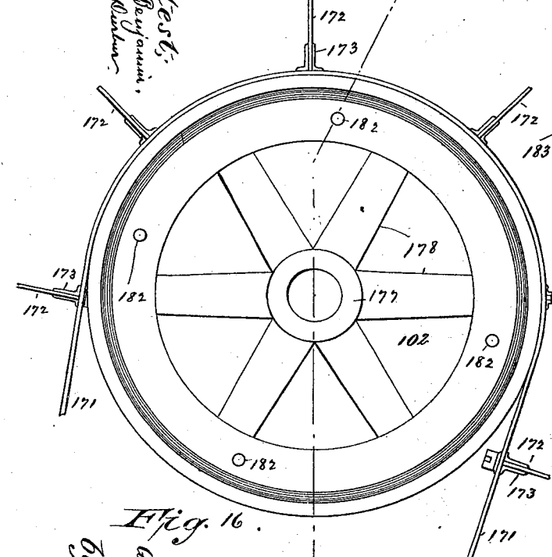
Fig. 16, a side elevation of the conveyer sprocket wheel, having a portion of the conveying belt thereon.
Figures 17, 18:
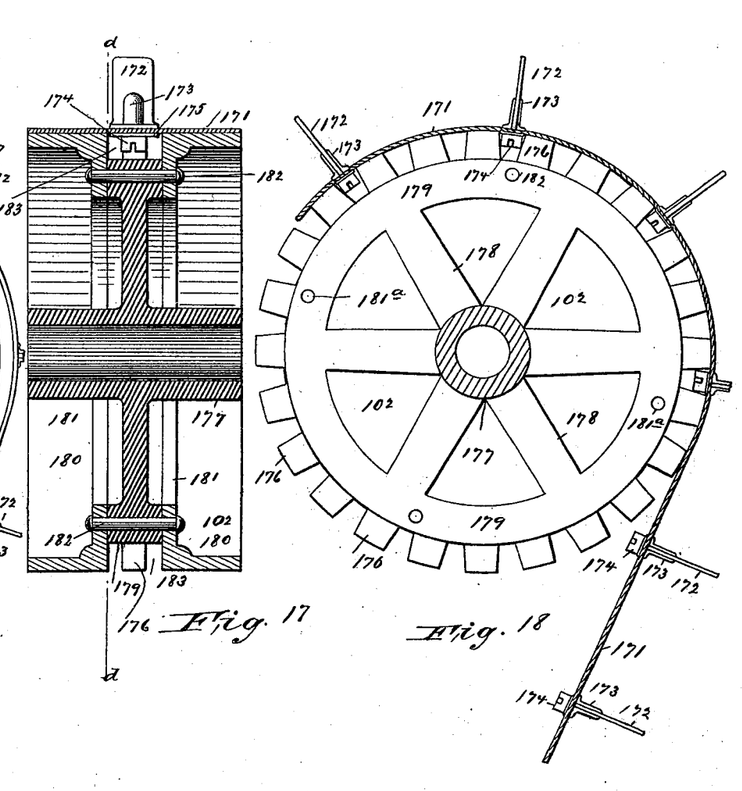
Fig. 17, a vertical transverse section thereof on the line $cc$, Fig. 16.
Fig. 18, a side elevation of the central portion of the wheel, partly in section on the line $dd$, Fig. 17.
Figure 27:
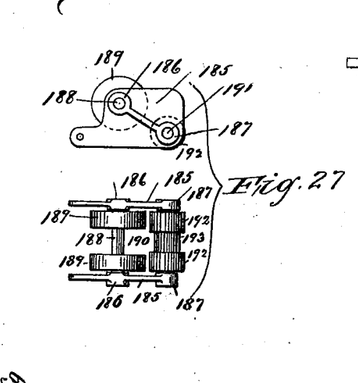
Fig. 27, a side elevation and plan, respectively, of the conveyer chute guide rollers, and their bearings.

The conveyer is constructed as follows: A trough 167, open at the top, is secured at the front end of the machine to a lug 168, Fig. 1, formed on the rear of the cross bar casting 124, Figs. 1 and 3, and at the rear end it rests in the bracket 128, 129, 130, Fig. 4, where it is continued in the upwardly extending chute 169 through the elbow 170, the trough and chute being made separate and secured together, or in one piece as desired. The trough 167 extends through the machine in such a position that it lies within the plane in which the cotton would fall from the picker stems (Fig. 5), one for each superposed wall or series of stems, and there is a separate chute for each series of stems. Within the trough and chute moves a conveyer belt 171 (Figs. 16, 17, and 18) which is provided with a series of wings 172 fast to studs 173 which receive the headed screws 174, the screws passing through the belt into the studs, between which screw and the belt lies a washer 175. The headed screw not only serves as a means for retaining the wings 172 upon the belt at suitable intervals, but by its engagement with the teeth or cogs 176 of the wheel 102, the belt is moved. The hub 177 of the wheel 102 is mounted to rotate on the shaft 101, Fig. 1. This wheel is made separable for economy in manufacturing and assembling, and comprises the central section having the hub 177, spokes 178, rim 179, and cogs 176, and the two outer halves 180 having the annular and circular rib 181. The rim 179 has a series of holes 181ª at each quarter section, and the ribs 181 have like holes through which rivets or bolts 182 pass and which unite all the parts together, the diameter of the inner section being smaller than the diameter of the outer halves 180, a peripheral channel 183 is left, in which the cogs 176 lie, and which also receives the headed screws 174 and washers 175, permitting the belt 171 to lie flush on the face of the outer halves, the whole being numbered 102. The belt is run to the forward end of the trough as shown, where it passes over a roller 184 suitably mounted in bearings in the walls of the trough as shown in Figs. 1 and 4. To enable it to turn the angle in the chute 179 the following guide rollers are used. Two bearing plates 185, Fig. 27, having journal bearings 186, 187 are secured on both sides of the chute 169 in the angle 170 thereof. In the bearings 186 is journaled a shaft 188 carrying two rollers 189 set so as to leave a space 190 between them, and in the bearings 187 is journaled a shaft 191 carrying the rollers 192 having a central hub 193 smaller in diameter than the rollers. Referring to Fig. 1 the position of the belt 171 in relation to these guide rollers will be seen, the space 190 being left for the passage of the wings 172, the headed screws 174 passing between the rollers 192. By reference to Fig. 5 it will be seen that the conveyer belt 171 with its projecting conveying wings 172 lie in close to the picker stems and within the plane of the fall of the cotton discharged therefrom. The power for running the conveyer belts is obtained from the shaft 134, upon which are adjustably secured the sprocket pinions 194, the hubs 195 of which are interiorly grooved to engage the feather 135 and which are secured in position by the set screws 196. From the wheels 194 lead sprocket chains 197 which pass over sprocket wheels 198 (the hubs of which only show in the views) fast to the shaft 101 upon which the wheel 102 is mounted, and by its rotation the belt 171 is moved by the engagement of the headed screws 174 with the cogs 176 thereof. The chute is open at the top (Fig. 2) and is provided with a segmental cover 199 secured to the chute in any desired manner, one of the sides being omitted in Fig. 1 for the purpose of showing the wheel 102. The chute is also open at the end, near the top, for a short distance, as defined by the rounded ledge 200 which is formed by bending over the metal of the chute to form a guide for the cotton which falls from the wings 172. A strap 201 braces the parts at this point, and another strap 201ª braces the chute below. Below the ledge 200 is secured to the chute a hooked hanger 202 having a series of hooks 203 by which a bag 204 or other like receptacle can be supported. It is thus clear that as the cotton drops from the picker stems onto the belt 171 the wings 172 will carry it forward over the roller 184 along the bottom of the trough 167 to the elbow 170, thence to the rear opening in the chute, and over the ledge 200 into the bag, the bottom and side of the trough and chute confining the cotton onto the conveyer wings.

To prevent the cotton held by the hackle pins of the stems from falling outwardly I mount a screen frame 205 on the side of the frame, its lower portion being secured to the trough 167 by the straps 206, within which frame a wire screen can be secured, it being broken away in the drawings (Fig. 1) to prevent confusion of details.

The picking instrumentalities comprising a series of rotatable hackle pins operating in a plane tangential to the axis of a containing cylinder and superposed in two walls opposing each other and both diverging from the rear to the front, can, as will be seen from the foregoing description, be subjected to three adjustments, to wit: one, where the aggregate of the picker stems is inclined at an angle to the horizontal by an adjustment of the relation of the draft bar to the main frame; another, where each stem can be raised or lowered on its support to operate at any height from the ground; and still another where the entire individual wall of superposed stems can be moved to or from the center of the main frame, which last involves a like movement of the motive instrumentalities for both the picker stems and the conveying device, the conveyer being moved at the same time.

A seat 207 is provided for the driver and operator, which seat is supported by the bar 208 bent flat at 209 to receive the seat, and at 210 where it is secured to the channel beam 7, the lever 162 for throwing the pickers and conveyers in or out of action being located in close proximity to the seat as shown. Suitable clamps for holding the plates 67, 94 in position can be used.

Many changes and alterations can be made in the device illustrated herein without departing from the spirit of my invention as disclosed.

I claim—

1. In a cotton harvester, the combination, with the main frame, of picker stems longitudinally disposed in relation to the main frame, picker holders for supporting the pickers, a vertical driving spindle having operative connections at different heights with the pickers, and a picker frame including and carrying the holders and spindle, said frame, holders, spindle and pickers being bodily movable to or from the longitudinal center of the main frame, substantially as described.

2. In a cotton harvester, the combination of the main frame, two picker frames suspended therefrom and lying longitudinally therewith, and a series of superposed pickers rotatably supported in each frame and forming opposing walls, and means for giving the pickers the following adjustments, to wit: at an angle to the horizontal; to or from the longitudinal center of the main frame; and up or down on their supports, each adjustment being independent of the other, substantially as described.

3. In a cotton picker stem, the combination with an obliquely perforated cylinder, of guide blocks in said cylinder, oblique slots in the blocks aligning with said perforations, and a series of hackle bars having projecting hackle pins adapted to be moved in and out of the perforations in the cylinder on lines oblique to its axis, and means for moving said bars, substantially as described.

4. In a cotton harvester, the combination, with the main frame, of laterally adjustable picker stems and laterally adjustable fenders protecting the ends of the picker stems, the adjustment of the stems being independent of that of the fenders, substantially as described.

5. In a cotton harvester, in a picker stem, the combination of an apertured cylinder, a slotted end block having an inwardly extending ledge, the slots extending through said ledge and hackle bars having extensions moving in said slots and shoulders engaging said ledge, substantially as described.

6. In a cotton harvester, the combination, with the main frame, of cross bars thereon, a block on said cross bars, depending rods for supporting the picker stems secured to said block, said block having also a rearward extension, and a conveyer supported on said extension, substantially as described.

7. In a cotton harvester, the combination of the main frame, cross bars thereon, a block adjustably mounted on said cross bars, depending rods secured to said block, and a hanger bar for supporting a picker stem, sleeved on said rods and extending inwardly therefrom, and means for securing the hanger bar at any desired height, substantially as described.

8. In a cotton harvester, the combination, with the main frame, of upper and lower cross bars, blocks mounted thereon, rods and hanger bars for the picker stems supported on said rods, and a rod carrying the mechanism for rotating the picker stems, all of said rods being connected to the upper and lower blocks, substantially as described.

9. In a cotton harvester, the combination of a picker stem cylinder head having an outwardly extending squared lug and shoulders thereon, with a hanger bar, depending rods on which it is sleeved, said hanger bar having projecting arms embracing the squared lug, and a pin for securing the same in position, substantially as described.

10. In a cotton harvester, the combination of a picker stem cylinder head, having an outwardly extending squared lug having extending arms flush with said lug, depending rods and a hanger bar adapted to be sleeved thereon, said hanger bar having a squared extension adapted to be embraced by said arms, said arms and extensions having registering apertures, and a pin adapted to pass through said apertures and secure the lug in position, substantially as described.

11. In a cotton harvester, the combination, with the main frame, of front and rear cross bars secured thereon, front and rear blocks secured on the cross bars, front and rear pairs of depending rods secured on the blocks, and front and rear hanger bars sleeved on the rods, the front hanger bar extending inwardly of the frame to a less distance than the rear, substantially as described.

12. In a cotton harvester, the combination, with the main frame and depending rods secured thereon, of a tie bar 125 secured at the lower ends of said rods, and projecting inwardly of the frame to serve as a support for the picker stem, substantially as described.

13. In a cotton harvester, the combination, with the main frame, and depending rods secured thereon, of a casting uniting the lower ends of said rods projecting inwardly to serve as a support for a picker stem, and having a downwardly and inwardly extending portion supporting a second picker stem below the first, substantially as described.

14. In a cotton harvester, in combination with the main frame, picker stems and conveyer, the casting having upper and lower inwardly extending arms 125, 131, for supporting the picker stems, and the U-shaped portion 128, 129, 130 for receiving the conveyer, substantially as described.

15. The combination, with the belt 171 having on one side the short projections 174 and on the other the long projections 172, of the turning or guide rollers 189 having a deep space 190 for the reception of the long projections 172, and the guide rollers 192 mounted adjacent to the rollers 189 having a shallow space between the rollers for the reception of the short projections 174, substantially as described.

Signed at the city, county, and State of New York this 10th day of January, 1893.

GEORGE LISPENARD.

Witnesses:
JOSEPH L. LEVY,
B. S. WISE.